United States Patent [19]
Vahey

[11] 3,955,121
[45] May 4, 1976

[54] SHORT-CIRCUIT PROTECTIVE SYSTEMS
[76] Inventor: Thomas J. Vahey, 2905 Brunswick Rd., Youngstown, Ohio 44511
[22] Filed: Sept. 16, 1974
[21] Appl. No.: 506,518

[52] U.S. Cl. ............................. 317/13 R; 317/27 R
[51] Int. Cl.² ............................................ H02H 3/28
[58] Field of Search ...................... 317/13 R, 27 R

[56] References Cited
UNITED STATES PATENTS

| | | | |
|---|---|---|---|
| 2,885,568 | 5/1959 | Reeder et al. | 317/13 R |
| 3,107,318 | 10/1963 | Lytle | 317/13 R |
| 3,675,080 | 7/1972 | Bath | 317/13 R |
| 3,851,216 | 11/1974 | Clarke et al. | 317/13 R |

FOREIGN PATENTS OR APPLICATIONS

| | | | |
|---|---|---|---|
| 105,356 | 4/1917 | United Kingdom | 317/27 |

*Primary Examiner*—J. D. Miller
*Assistant Examiner*—Harry Moose
*Attorney, Agent, or Firm*—Michael Williams

[57] ABSTRACT

My invention relates to short-circuit protective systems for polyphase dynamo electric machine, which systems are very sensitive and respond to ground short-circuits as well as to phase-to-phase short circuits. The invention comprises two or three small current transformers connected to a single instantaneous relay which is applied to trip the machine contactor or breaker when any ground short-circuit or phase-to-phase short-circuit occurs.

11 Claims, 2 Drawing Figures

SHORT-CIRCUIT PROTECTIVE SYSTEMS

BACKGROUND AND SUMMARY

"Ground relay" circuits (ground short-circuit protection) and "differential relay" circuits (phase-to-phase short-circuit protection) are known in the prior art. However, such known circuits are complicated and therefore costly, whereas my invention provides equivalent protection with a simpler and less costly circuit.

In the prior protection systems known to me, short-circuit protection required a ground relay connected to a ground current transformer and three differential relays connected to three differential current transformers. The system of my invention reduces the number of relays and current transformers required to accomplish the desired result and therefore not only reduces cost but also minimizes maintenance problems.

Accordingly, my invention relates to a simplification in the control apparatus for short-circuit protection of an electric motor or an electric generator, and particularly to protection for a ground short-circuit and/or for a short-circuit between two or more phases in the motor.

DESCRIPTION OF THE DRAWING

In the drawing accompanying this specification and forming a part of this application there are shown, for purpose of illustration, embodiments which my invention may assume, and in this drawing.

DESCRIPTION OF THE PREFERRED EMBODIMENT

Figure 1:
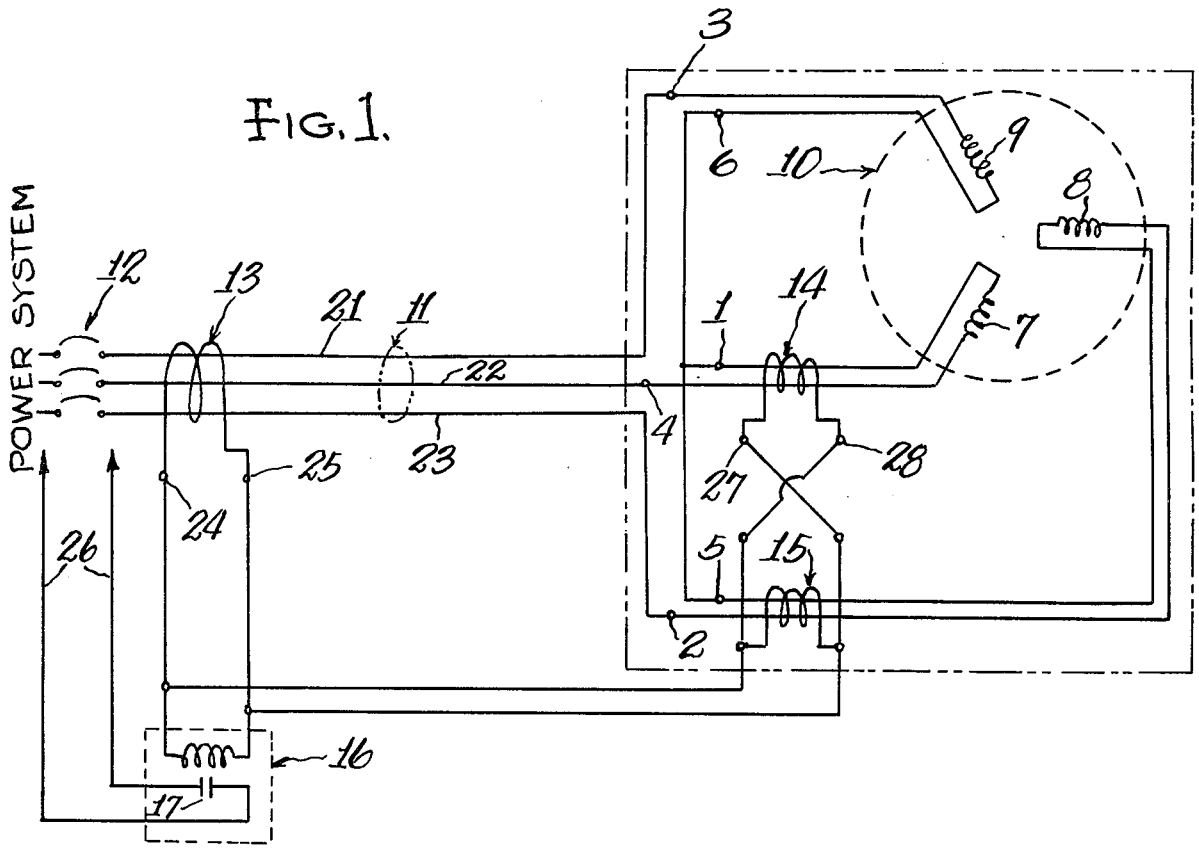
FIGS. 1 and 2 are electrical diagrams illustrating two embodiments of my invention.

FIG. 1 discloses a three-phase power system connected through circuit breaker 12, ground current transformer 13, power cable 11, two differential current transformers 14 and 15 at the motor, and to the motor or generator 10 having the three internal windings 7, 8 and 9.

Leading from the circuit breaker 12, the three phases of the power cable pass through the ground current transformer 13 with a predetermined ratio (such as 50:5 in the disclosed embodiment) and act as a common primary winding on the transformer. The secondary conductors 24 and 25 of the ground current transformer 13 are connected to a single trip relay 16. The contact 17 of the trip relay 16 is connected to the trip circuit 26 of the breaker 12, so that when trip relay 16 operates, the breaker 12 is tripped to disconnect the motor or generator 10 from the power system.

At the motor 10, two conductors 2 and 5 of one internal motor winding 8 pass through the differential current transformer 15 with a predetermined ratio which is different from the ratio of the ground current transformer 13 (such as 100:5 in the disclosed embodiment).

The two conductors 2 and 5 pass through the current transformer 15 and act as a common primary winding on this transformer. The secondary conductors of differential current transformer 15 are connected to the single trip relay 16, in parallel with the wires 24, 25 from the ground current transformer 13. The polarity of the connections from current transformers 13 and 15 is not important, because these two transformers have different ratios (50:5 and 100:5, respectively, in the disclosed embodiment).

Also, at the motor 10 two conductors 1 and 4 of the internal motor winding 7 pass through the differential current transformer 14, with a ratio preferably the same as the transformer 15 (100:5 in the disclosed embodiment). The two conductors 1 and 4 pass through current transformer 14 and act as a common primary winding on this transformer. The secondary conductors 27 and 28 of transformer 14 must be reversed when the ratios of transformers 14 and 15 are the same as in the disclosed embodiment, and are connected in parallel with the secondary conductors of transformer 15.

The second differential current transformer 14 could be selected with a ratio of 75:5 for example, which is different from the ratios of either of the other two current transformers 13 and 15. If all the three current transformers 13, 14 and 15 were selected with different ratios, such for example as 50:5, 75:5 and 100:5 reversal of the secondary conductors 27 and 28 of the transformer 14 would not be necessary, and polarity of the current transformer connection would not be important with any of the three current transformers 13, 14 and 15.

If any ground short circuit should exist in the circuit shown in FIG. 1, such as current flowing to ground from any conductor 21, 22, 23 of the power cable, or conductors 1, 2, 3, 4, 5 or 6 of the system connections, or from any winding 7, 8, or 9 inside the machine 10, ground current transformer 13 will have a current output that will operate trip relay 16 at a preset value, and this will close contact 17 and, through breaker trip circuit 26, will trip breaker 12 to quickly disconnect the ground short-circuit from the power system.

For any phase-to-phase short-circuit within the machine 10, such as short-circuits between windings 7 and/or 8 and/or 9, current transformer 14 and/or current transformer 15 will have a current output that will operate trip relay 16 and thereby quickly disconnect the short-circuit from the power system, in the manner stated above.

If both current transformers 14 and 15 have an output, the two outputs will be additive in the disclosed embodiment, due to the reversal of secondary conductors 27 and 28, and will operate trip relay 16 to disconnect the short-circuit from the power system.

For any ground short-circuit from windings 7 and/or 8 to ground, current transformers 13 and 14 and/or 15 will both have an output, but of unequal values. One combination of transformers, such as 13 and 14, will produce subtractive values, whose difference will also operate the trip relay 16.

From the foregoing, it will be appreciated that any phase-to-phase short-circuit inside the machine 10 and/or any ground short-circuit will quickly trip the relay 16 to operate the circuit breaker 12 and disconnect the short-circuit from the power source, to minimize damage to the machine and equipment and enhance safety.

In summation, the preferred embodiment described above provides a simplified, low cost circuit which monitors the currents in the power lines of an electric motor or generator and quickly interrupts power to or from the machine if a ground short-circuit and/or a phase-to-phase short-circuit occurs when the machine is started, or when it is running. The circuit includes only three current transformers connected to a single trip relay which in turn controls operation of a circuit breaker. The dot-dash lines in FIG. 1 show a portion of

DESCRIPTION OF OTHER EMBODIMENT

Figure 2:
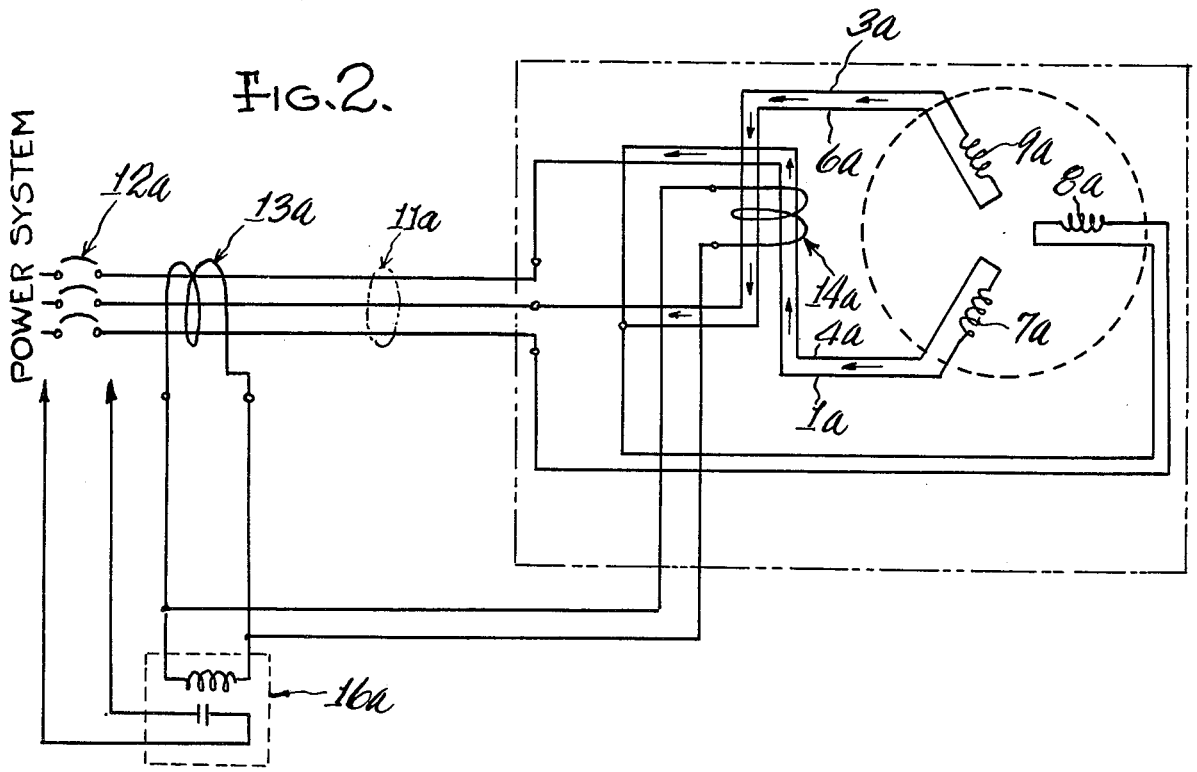

FIG. 2 shows aa further simplification of the protective circuit, particularly for use with smaller motors or generators. In this embodiment, the current transformer 15 of FIG. 1 may be eliminated, with phase-to-phase short-circuit between internal wiring 7a and 9a under control of current transformer 14a.

It will be noted that the two conductors 1a and 4a of internal motor winding 7a pass through current transformer 14a in one direction, and the two conductors 3a and 6a of internal motor winding 9a also pass through current transformer 14a, but in the opposite direction. In this embodiment, the ratio of current transformer 14a must be different than that of ground current transformer 13a and, as an example the ratio of transformer 13a may be 50:5 while the ratio of differential current transformer 14a may be 100:5 for proper operation of the control circuit.

Phase-to-phase protection between windings 7a, 9a; 7a, 8a; and 8a, 9a; is provided by the current transformer 14a, since a short-circuit between any pair, or short-circuit from either winding 7a or 9a will cause a current output in transformer 14a to trip relay 16a which in turn trips the circuit breaker 12a in the power line.

A short-circuit from only internal winding 8a will cause a current flow in ground current transformer 13a to trip the relay 16a. The transformer 13a also monitors any ground short-circuit in the power lines, as before.

I claim:

1. A short-circuit protective system for a polyphase dynamoelectric machine responsive to power cable-to-ground short-circuits and also to phase winding-to-ground and phase-to-phase short-circuits, comprising:
   a circuit breaker for controlling flow of electricity in a polyphase cable electrically connected to said machine,
   a trip relay for controlling trip operation of said circuit breaker,
   a ground current transformer connected to said relay and sensitive to current flowing to ground from said polyphase cable and the polyphase windings of said machine extending from said cable, said ground current transformer when sensitized causing said trip relay to open said circuit breaker,
   differential current transformer means connected to said relay and sensitive to short circuits from a phase winding-to-ground and to phase-to-phase short-circuits, said transformer means when sensitized causing said trip relay to open said circuit breaker, and,
   means causing said phase winding transformer means to have a secondary output to said trip relay electrically different from the secondary output of said ground current transformer upon the occurrence of any said short-circuit,
   thereby to trip said relay notwithstanding the common connection of said transformers thereto.

2. The system according to claim 1 wherein said polyphase cable passes through said ground current transformer and forms the primary thereof.

3. The system according to claim 1 wherein leads extending from two phase windings of said machine pass through said differential current transformer in opposite directions.

4. The protective system of claim 1 wherein said differing outut means comprises differing transformer ratios on said ground current transformer and said differential current transformer means.

5. The protective system of claim 1 wherein said polyphase machine has three phases, and,
   wherein said differential transformer means is cooperatively associated with two of said phases, and
   wherein further the secondary output from said transformer means is electrically reversed from the two said phases.

6. The protective system of claim 1 wherein said polyphase machine has three phases, and said differential transformer means is cooperatively associated with only two of the three phase windings.

7. The system according to claim 1 wherein said differential current transformer means is a first transformer cooperable with conductors leading from one phase winding of said machine, and includes
   a second differential current transformer is cooperable with conductors leading from another phase winding of said machine.

8. The system according to claim 7 wherein said first and second differential current transformers are connected in parallel with said trip relay.

9. The system according to claim 7 wherein the conductors leading from one phase wnding are reversed with respect to the conductors leading from the other phase winding, said transformers having similar ratios.

10. The system according to claim 7 wherein the conductors leading from the phases of said machine respectively pass through said first and second differential current transformers and form the primary thereof.

11. The protective system of claim 7 wherein said first and second differential transformers and said ground current transformer each have a different transformer ratio.

* * * * *